US006988858B2

(12) United States Patent
Gates, Jr. et al.

(10) Patent No.: US 6,988,858 B2
(45) Date of Patent: Jan. 24, 2006

(54) OXIDATION-RESISTANT CUTTING ASSEMBLY

(75) Inventors: Alfred S. Gates, Jr., Greensburg, PA (US); Edward J. Oles, Ligonier, PA (US); Kent L. Reiner, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/795,215

(22) Filed: Feb. 28, 2001

(65) Prior Publication Data

US 2002/0119017 A1 Aug. 29, 2002

(51) Int. Cl.
*B23B 27/22* (2006.01)

(52) U.S. Cl. ...................................... 407/100; 407/118

(58) Field of Classification Search ................ 407/100, 407/101, 102, 103, 107, 111, 115, 118, 119, 407/120, 5, 6, 3

See application file for complete search history.

(56) References Cited

U.S. PATENT DOCUMENTS 2,823,447 A 2/1958 Doerseln et al. ............... 29/96
2,848,789 A * 8/1958 Friedline ....................... 407/6
2,865,084 A * 12/1958 Wendt et al. .................. 407/6
3,172,190 A * 3/1965 Beach ........................... 407/4
3,239,911 A 3/1966 Williams ....................... 29/96
3,281,920 A * 11/1966 Eriksson ........................ 407/3
3,543,363 A 12/1970 Diemond .................... 407/101
3,864,799 A * 2/1975 McCreery et al. .......... 407/101
3,996,651 A 12/1976 Heaton et al. ................. 29/96
4,011,049 A 3/1977 McCreery ...................... 29/96
4,244,666 A 1/1981 Erickson et al. ............ 407/105
4,245,937 A 1/1981 Erickson ..................... 407/105
4,539,251 A 9/1985 Sugisawa et al. ........... 428/216
4,547,470 A 10/1985 Tanase et al. ................. 501/87
4,563,433 A 1/1986 Yeckley et al. ............... 501/97
4,695,208 A * 9/1987 Yankoff ...................... 407/100
4,711,644 A 12/1987 Yeckley et al. ............... 51/307
4,826,791 A 5/1989 Mehrotra et al. ............. 501/89
4,880,755 A 11/1989 Mehrotra et al. ............. 501/96
4,938,639 A * 7/1990 Lockard ..................... 407/103
4,965,231 A 10/1990 Mehrotra et al. ............. 501/89
4,984,940 A * 1/1991 Bryant et al. ............... 407/119
5,024,976 A 6/1991 Mehrotra et al. ............. 501/89
5,059,564 A 10/1991 Mehrotra et al. ............. 501/89
5,123,787 A 6/1992 Hunt ........................... 407/39
5,135,801 A 8/1992 Nystrom et al. ............ 428/216
5,162,147 A * 11/1992 Ruppi ........................ 428/216
5,222,841 A * 6/1993 Simkhovich ................ 407/107
5,250,367 A * 10/1993 Santhanam et al. ......... 428/698
5,272,940 A 12/1993 Diskin ....................... 76/108.6
5,326,380 A 7/1994 Yao et al. ...................... 51/293
5,336,026 A 8/1994 Noggle ....................... 408/147
5,370,716 A 12/1994 Mehrotra et al. ............. 51/293

(Continued)

FOREIGN PATENT DOCUMENTS

EP 0568515 8/1996

(Continued)

*Primary Examiner*—Henry W. H. Tsai
(74) *Attorney, Agent, or Firm*—John J. Prizzi

(57) ABSTRACT

A cutting assembly that includes a tool holder that contains a pocket therein. A shim and/or pocket insert along with a cutting insert are within the pocket of the tool holder. The shim may present an oxidation-resistant surface. Exemplary materials for the shim include ceramics and coated cemented carbides and cermets. The pocket may present an oxidation-resistant surface wherein the pocket may have an oxidation-resistant coating or an oxidation-resistant pocket insert may be positioned within the pocket.

44 Claims, 2 Drawing Sheets

U.S. PATENT DOCUMENTS

| | | | | | |
|---|---|---|---|---|---|
| 5,411,354 | A | | 5/1995 | Gustafsson | 407/110 |
| 5,597,272 | A | * | 1/1997 | Moriguchi et al. | 407/119 |
| 5,628,590 | A | * | 5/1997 | Beeghly et al. | 407/114 |
| 5,639,285 | A | | 6/1997 | Yao et al. | 51/307 |
| 5,652,045 | A | | 7/1997 | Nakamura et al. | 428/216 |
| 5,676,496 | A | | 10/1997 | Litteckek et al. | 407/118 |
| 5,705,263 | A | | 1/1998 | Lenander et al. | 428/216 |
| 5,712,030 | A | | 1/1998 | Goto et al. | 428/332 |
| 5,770,261 | A | | 6/1998 | Nakamura et al. | 427/255 |
| 5,786,069 | A | | 7/1998 | Ljungberg et al. | 428/216 |
| 5,882,778 | A | * | 3/1999 | Sugizaki et al. | 428/216 |
| 5,976,716 | A | | 11/1999 | Inspektor | 428/698 |
| 5,996,714 | A | | 12/1999 | Massa et al. | 175/413 |
| 6,017,172 | A | * | 1/2000 | Ukegawa et al. | 407/113 |
| 6,054,185 | A | | 4/2000 | Inspektor | 427/419.7 |
| 6,090,476 | A | | 7/2000 | Thysell et al. | 428/216 |
| 6,117,533 | A | | 9/2000 | Inspektor | 428/216 |
| 6,146,062 | A | * | 11/2000 | Jansson | 407/107 |
| 6,148,937 | A | * | 11/2000 | Mensa-Wilmot et al. | 175/428 |
| 6,170,368 | B1 | * | 1/2001 | Oles et al. | 407/115 |
| 6,284,366 | B1 | * | 9/2001 | Konig et al. | 428/336 |
| 6,379,087 | B1 | * | 4/2002 | Alexander, IV | 407/105 |
| 6,394,709 | B1 | * | 5/2002 | Sjoo et al. | 407/105 |

FOREIGN PATENT DOCUMENTS

| | | |
|---|---|---|
| WO | 0068454 | 11/2000 |
| WO | 0070120 | 11/2000 |

* cited by examiner

OXIDATION-RESISTANT CUTTING ASSEMBLY

FIELD OF THE INVENTION

The invention pertains to a cutting assembly that includes a tool holder that contains a pocket, a shim, and a cutting insert. The invention further pertains to a tool holder assembly that comprises a tool holder that contains a pocket and a shim. The invention also pertains to a shim for use with a tool holder that contains a pocket and a cutting insert.

BACKGROUND OF THE INVENTION

Certain cutting assemblies used for the removal of material may include a tool holder that contains a pocket, a shim and a cutting insert. Typically, the shim is affixed within the pocket such as, for example, by a shim screw or a threaded pin. The cutting insert typically rests upon the upper surface of the shim and is affixed (or firmly secured) thereto by a clamp member. There may be a mechanical chip breaker between the clamp and the cutting insert.

Certain material removal applications, e.g., a turning application, use a coated or an uncoated polycrystalline cubic boron nitride (PCBN) cutting insert. While current PCBN cutting inserts (coated and uncoated) perform adequately, a material removal application that uses such a cutting insert generates a great amount of heat. This heat generally passes into the shim upon which the cutting insert rests so that the shim becomes hot. In some situations, especially when the cutting length is particularly long, for example, one or more hours in a cut such as may be encountered with machining a mill roll such as a steel mill roll, this heat passes into the pocket region of the tool holder and causes the pocket to become hot resulting in oxidation of the toolholder assembly including the shim.

In the past, the shim has been made from a carbide-based material (e.g., cemented (cobalt) tungsten carbide). When the shim received the heat from the material removal application and thereby became hot (e.g., a temperature greater than about 400 degrees Centigrade), it oxidized wherein the oxidation was greatest in those portions defined by the surfaces exposed to the air. Because the oxidized portions of the shim (i.e., the oxidized tungsten carbide-cobalt material) had a lower density than the non-oxidized material, those portions of the shim that were exposed to the air increased in size. Such an increase in size caused a raised ridge in the region of the cutting edge in the area of the cut. Upon the indexing of the cutting insert, such a ridge resulted in the misalignment of the cutting insert with respect to the shim. This misalignment caused the cutting insert to chip under certain circumstances.

In addition, the oxidized tungsten carbide-cobalt material is itself very brittle. The oxidized tungsten carbide-cobalt material also has poor adhesion to the non-oxidized tungsten carbide-cobalt material. Upon continued use of the cutting assembly, the oxidized tungsten carbide-cobalt material falls away from the shim which leaves large pits along the edge of the shim where the rate of oxidation is the greatest and in areas beneath the PCBN cutting insert that oxidize more slowly. The result is the existence of pits and ridges in the shim that cause unstable seating of the cutting insert.

In a situation in which the pocket region of the tool holder would receive heat and reach a temperature in excess of about 400 degrees Centigrade, the region of the tool holder that defines the pocket would experience oxidation. Since the tool holder is typically made from steel, and in some cases it may be made from tungsten carbide, the oxidation would result in an increase in the size of the surfaces that define the pocket since the oxidized material has a lower density than the non-oxidized material. Under certain circumstances, such a change in the dimension of the pocket would result in the misalignment of the cutting insert upon indexing. Such misalignment could result in chipping of the cutting insert.

It would thus be desirable to provide a cutting assembly that includes a shim that maintains its dimensional integrity during the material removal operation. As a result, upon indexing of the cutting insert, alignment and support would be maintained between the cutting insert and the shim so as to minimize the potential for the chipping of the cutting insert. Further, alignment and support would be maintained so as to minimize the potential for loss of wear resistance because of an improper attack angle in the material removal operation even when the PCBN cutting insert does not chip.

It would also be desirable to provide a cutting assembly that includes a tool holder wherein the region of the tool holder adjacent to the pocket exhibits oxidation resistance so as to maintain its dimensional integrity. As a result, upon indexing of the cutting insert, alignment and support would be maintained between the cutting insert and the shim so as to minimize the potential for the chipping of the cutting insert. Further, alignment and support would be maintained so as to minimize the potential for loss of wear resistance because of an improper attack angle in the material removal operation even when the PCBN cutting insert does not chip.

SUMMARY OF THE INVENTION

In one form, the invention is a cutting assembly that comprises a tool holder that includes a pocket. The cutting assembly further includes a shim contained within the pocket. The shim presents an oxidization-resistant surface. The cutting assembly also includes a cutting insert that rests upon the shim.

In another form thereof the invention is a cutting assembly that comprises a tool holder that has a pocket that presents an oxidation-resistant surface. The cutting assembly also has a shim contained within the pocket. The cutting assembly further has a cutting insert that rests upon the shim.

In still another form thereof, the invention is a tool holder assembly that comprises a tool holder that contains a pocket. The assembly further has a shim contained within the pocket. The shim presents an oxidation-resistant surface.

In yet another form thereof, the invention is a shim for use in conjunction with a tool holder that contains a pocket wherein the shim is within the pocket. The shim has a shim body wherein the shim body presents an oxidation-resistant surface.

In yet still another form thereof, the invention is a mechanical chipbreaker for use in conjunction with a cutting insert secured within the pocket of a tool holder. The chipbreaker has a chipbreaker body. The chipbreaker body presents an oxidation-resistant surface.

BRIEF DESCRIPTION OF THE DRAWINGS

The following is a brief description of the drawings that form a part of this patent application.

DETAILED DESCRIPTION OF THE INVENTION

Figure 1:
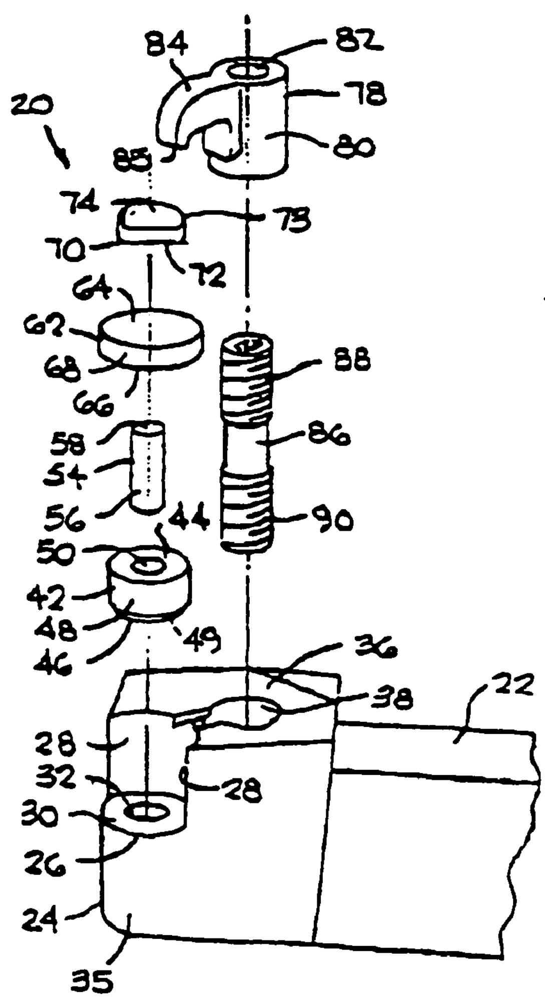
FIG. 1 is an isometric view of a specific embodiment of a cutting assembly with the components (including the tool holder, the shim, the mechanical chipbreaker, and the cutting insert) exploded away from one another.

Referring to the drawings, FIG. 1 illustrates a specific embodiment of a cutting assembly generally designated as 20. Cutting assembly 20 includes a tool holder 22 that has one end 24 at which there is a generally circular pocket 26. The pocket 26 has a pair of generally arcuate side surfaces 28 that intersect with a generally circular bottom surface 30. In the specific embodiment of FIG. 1 the side surfaces 28 are spaced apart at the boundary of their closest proximity. The tool holder 22 contains an aperture 32 in the bottom surface 30 of the pocket 26.

The tool holder 22 further includes a head portion 35 that presents a top surface 36. The tool holder 22 contains a threaded aperture 38 in the top surface 36 thereof.

Cutting assembly 20 includes a shim 42 that presents an oxidation-resistant surface as hereinafter described. Shim 42 has a top surface 44, a bottom surface 46, and a cylindrical side surface 48 that intersects with the top and bottom surfaces (44 and 46, respectively). Although the geometry may vary depending upon the application, shim 42 has a generally cylindrical geometry. The shim 42 has a chamfer 49 at the bottom circumferential edge thereof. The shim 42 contains an aperture 50 therein. The shim 42 comprises an uncoated ceramic material so that the shim 42 presents an oxidation-resistant surface. As an option, the ceramic shim may have a coating thereon so that the shim would comprise a ceramic substrate having an oxidation-resistant coating.

Exemplary ceramic materials for the shim include silicon nitrides or SiAlONs or alumina-based materials. Patents that are exemplary of the silicon nitride or SiAlON ceramic materials include U.S. Pat. No. 4,563,433 to Yeckley, U.S. Pat. No. 4,711,644 to Yeckley, U.S. Pat. No. 4,889,755 to Mehrotra et al., U.S. Pat. No. 5,370,716 to Mehrotra et al., and U.S. Pat. No. 4,826,791 to Mehrotra et al. Patents that are exemplary of the alumina-based materials include U.S. Pat. No. 5,059,564 to Mehrotra et al., U.S. Pat. No. 5,024,976 to Mehrotra et al. and U.S. Pat. No. 4,965,231 to Mehrotra et al. An exemplary ceramic material for the shim may also include hafnia or zirconia.

In the alternative, the shim 42 may comprise a cermet substrate or a carbide-based substrate with an oxidation-resistant coating applied thereto. Exemplary carbide-based materials for the substrate in the alternative embodiment of the shim include cemented (cobalt) tungsten carbide wherein the cobalt content may range between about 0 weight percent and about 13 weight percent, and more preferably, the cobalt content ranges between 3 weight percent and 13 weight percent, and most preferably between about 6 weight percent and about 11 weight percent. Cemented (cobalt) tungsten carbide material may optionally contain additives such as titanium, tantalum, niobium, chromium and vanadium.

Exemplary oxidation-resistant coatings (applied by physical vapor deposition [PVD] or chemical vapor deposition [CVD] depending upon the specific situation) for application to the substrate (e.g., carbide-based material, cermet material or ceramic material) may include alumina, titanium aluminum nitride, titanium nitride, titanium carbonitride, titanium carbide, or titanium diboride in single layer as well as various multi-layer coating schemes. One exemplary single layer coating scheme comprises a layer of titanium aluminum nitride applied by physical vapor deposition. Referring to multi-layer coating schemes, one such coating scheme may comprise a base layer (e.g., titanium carbide) and a coating of alumina on the base layer. Another coating scheme may comprise a base layer (e.g., titanium carbide), an intermediate layer of alumina on the base layer, and a layer of titanium nitride on the alumina layer. Yet another coating scheme may comprise a base layer titanium nitride applied by CVD to the substrate and a layer of titanium aluminum nitride applied by PVD to the base layer. Another coating scheme may comprise a base layer of titanium carbide applied by CVD to the substrate, a first intermediate layer of alumina applied by CVD to the base layer, a second intermediate layer of titanium nitride applied by CVD to the first intermediate layer, and a top layer of titanium nitride or titanium aluminum nitride or titanium diboride applied to the second intermediate layer by PVD.

Cutting assembly 20 further has a cylindrical shim pin 54 that has a shank 56 and a top end 58. The shim pin 54 passes through the aperture 50 in the shim 42 and into engagement with the aperture 32 in the pocket 26. The shim pin 54 positions the shim 42 within the pocket 26 of the tool holder 22. The top end 58 of the shim pin 54 is flush with the top surface 44 of the shim 42.

Cutting assembly 20 also includes a cutting insert 62. While the cutting insert 62 may comprise any one of a number of commonly used materials, one preferred embodiment of the cutting insert 62 is a coated or an uncoated polycrystalline cubic boron nitride (PCBN). Other options for the cutting insert 62 include an uncoated polycrystalline diamond cutting insert or a diamond coated cutting insert. Cutting insert 62 is shown as being of a generally cylindrical shape so that it has a top surface 64, a bottom surface 66, and a side surface 68 that intersects with the top and bottom surfaces (64 and 66, respectively) to form opposite cylindrical circumferential edges that typically are chamfered. However, the cutting insert could take on other geometries depending upon the application. The bottom surface 66 of the cutting insert 62 rests upon the top surface 44 of the shim 42.

Figure 6:
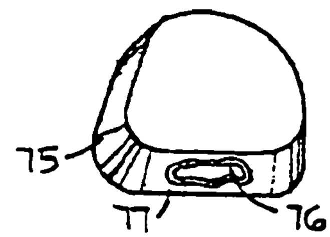
FIG. 6 is an isometric view of a mechanical chipbreaker that has an oxidation-resistant coating thereon wherein a portion of the oxidation-resistant coating has been removed to expose the underlying substrate.

The cutting assembly 20 further comprises a discrete mechanical chip breaker 70 that has a bottom surface 72, an arcuate (or rounded) rear surface 73, and a top surface 74. When assembled, the bottom surface 72 of the chip breaker 70 rests upon the top surface 64 of the cutting insert 62. Although this embodiment shows a discrete chipbreaker, applicants contemplate that the cutting insert may include integral chipbreaker feature(s). The specific embodiment of FIG. 1 depicts an uncoated chipbreaker; however, applicants contemplate that the chipbreaker may be coated with an oxidation-resistant coating. Referring to FIG. 6., there is shown a coated chipbreaker 75 that has a substrate (or chipbreaker body) 76 with an oxidation-resistant coating 77 thereon. A portion of the coating 77 is removed to expose the underlying substrate 76. The substrate 76 may comprise any one of a ceramic material, a cermet material or a carbide-based material (e.g., cemented (cobalt) tungsten carbide). The oxidation-resistant coating may comprise any one of the coating materials and coating schemes described hereinabove in connection with shim 42.

Cutting assembly 20 also has a clamp 78. Clamp 78 has a generally cylindrical body 80 with a threaded aperture 82 passing through the length of the body 80. Clamp 78 further includes an integral arm 84 that has a distal end 85. A clamp screw 86 has an upper threaded portion 88 and a lower threaded portion 90. The lower threaded portion 90 of the clamp screw 86 is received within the threaded aperture 38. The upper threaded portion 88 of the clamp screw 86 is received within the threaded aperture 82 of the clamp 78. The clamp 78 is tightened down by the rotation of the clamp screw 86 so that the arm presses against the chipbreaker 70 which, in turn, presses against the cutting insert 62 whereby the cutting insert 62 and chipbreaker 70 are firmly secured to the tool holder 22.

Although the specific embodiment shows a tool holder of a particular design, applicants contemplate that the present invention may be used in conjunction with tool holders having geometries and configurations different from that shown herein. These other tool holder designs are well-known to those skilled in the art.

Figure 2:
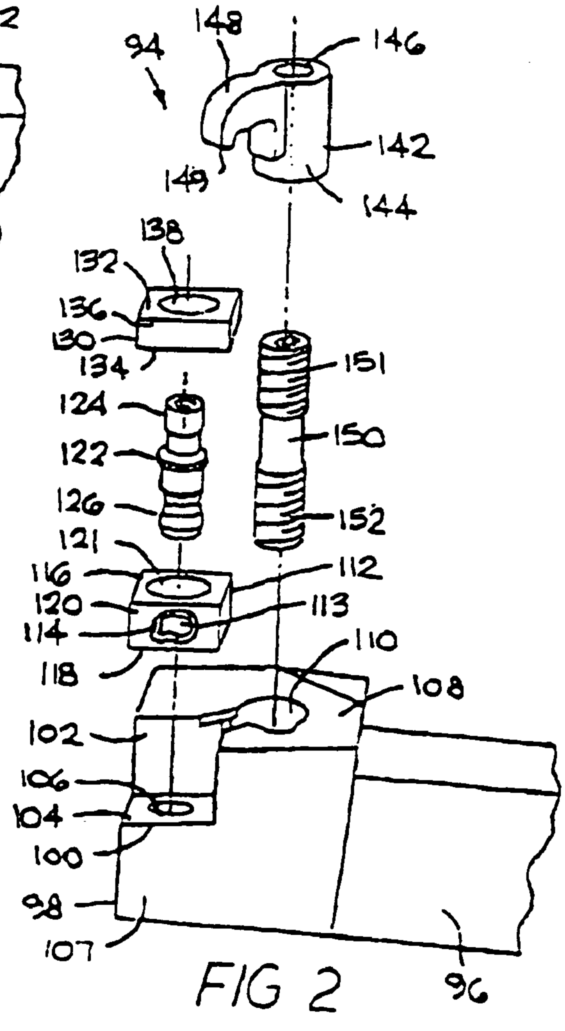
FIG. 2 is an isometric view of another specific embodiment of a cutting assembly with the components (including the tool holder, the shim, the mechanical chipbreaker, and the cutting insert) exploded away from one another, and wherein a portion of the coating on the shim has been removed to expose the underlying substrate.

Referring to FIG. 2, there is illustrated another specific embodiment of the cutting assembly generally designated as 94. Cutting assembly 94 includes a tool holder 96 that has one end 98 with a pocket 100 therein. The pocket 100 has a pair of side surfaces 102 and a bottom surface 104 that intersects the side surfaces 102. The tool holder 96 contains an aperture 106 in the bottom surface 104 of the pocket 100. The tool holder 96 also has a head portion 107 that has a top surface 108. The top surface 108 of the head portion 107 contains a threaded aperture 110 therein.

Cutting assembly 94 further includes a shim 112 that has a top surface 116, a bottom surface 118, and four side surfaces 120. The side surfaces 120 intersect the top and bottom surfaces (116 and 118, respectively). Shim 112 further contains an aperture 121. In the specific embodiment of FIG. 2, the shim 112 comprises a carbide-based substrate 113 having an oxidation-resistant coating 114 applied thereto. In FIG. 2, a portion of the oxidation-resistant coating 114 has been removed to expose the underlying substrate 113.

Exemplary carbide-based materials for the substrate in the embodiment of the shim 112 include cemented (cobalt) tungsten carbide wherein the cobalt content may range between about 0 weight percent and about 13 weight percent, and more preferably, the cobalt content ranges between 3 weight percent and 13 weight percent, and most preferably between about 6 weight percent and about 11 weight percent. Cemented (cobalt) tungsten carbide material may optionally contain additives such as titanium, tantalum, niobium, chromium and vanadium. An optional material for the substrate 113 is a cermet wherein the cermet would have an oxidation-resistant coating thereon.

Exemplary oxidation-resistant coatings (applied by physical vapor deposition [PVD] or chemical vapor deposition [CVD] depending upon the specific situation) for application to the carbide-based substrate may include alumina, titanium aluminum nitride, titanium nitride, titanium carbonitride, titanium carbide, or titanium diboride in single layer as well as various multi-layer coating schemes. One exemplary single layer coating scheme comprises a layer of titanium aluminum nitride applied by PVD. Referring to multi-layer coating schemes, one coating scheme may comprise a base layer (e.g., titanium carbide) and a coating of alumina on the base layer. Another coating scheme may comprise a base layer (e.g., titanium carbide), an intermediate layer of alumina on the base layer, and a layer of titanium nitride on the alumina layer. Yet another multi-layer coating scheme may comprise a base layer of titanium nitride applied by CVD to the substrate and a layer of titanium aluminum nitride applied by PVD to the base layer. Another coating scheme may comprise a base layer of titanium carbide applied by CVD to the substrate, a first intermediate layer of alumina applied by CVD to the base layer, a second intermediate layer of titanium nitride applied by CVD to the first intermediate layer, and a top layer of titanium nitride or titanium aluminum nitride or titanium diboride applied to the second intermediate layer by PVD.

Shim 112 may optionally be made from a ceramic material such as, for example, a silicon nitride or a SiAlON material or an alumina-based material. Patents that are exemplary of silicon nitride or SiAlON ceramic materials include U.S. Pat. No. 4,563,433 to Yeckley, U.S. Pat. No. 4,711,644 to Yeckley, U.S. Pat. No. 4,889,755 to Mehrotra et al., U.S. Pat. No. 5,370,716 to Mehrotra et al., and U.S. Pat. No. 4,826,791 to Mehrotra et al. Patents that are exemplary of the alumina-based materials include U.S. Pat. No. 5,059,564 to Mehrotra et al., U.S. Pat. No. 5,024,976 to Mehrotra et al. and U.S. Pat. No. 4,965,231 to Mehrotra et al. Shim 112 may also be made of zirconia or hafnia.

As an option, the ceramic substrate may have an oxidation-resistant coating thereon. Exemplary oxidation-resistant coating materials and coating schemes are like those described in conjunction with the shim 112 that has a carbide-based substrate.

Cutting assembly 94 further comprises a pin 122. The pin 122 has an upper portion 124 and a lower portion 126. The pin 122 passes through the aperture 121 in the shim 112 whereby the lower portion 126 is received within the aperture 106 in the pocket 100 of the tool holder 96. The pin 122 positions the shim 112 within the pocket 100 of the tool holder 96. The upper portion 124 of the pin 122 extends upwardly past the top surface 116 of the shim 112.

The cutting assembly 94 further has a cutting insert 130 that presents a generally rectangular shape so that it has a top surface 132, a bottom surface 134 and four side surfaces 136. However, the cutting insert may take on other geometries depending upon the application. The side surfaces 136 join together the top and bottom surfaces (132 and 134, respectively). Cutting insert 130 contains an aperture 138 therein. The cutting insert 130 is positioned so that the upper portion 124 of the pin 122 passes through the aperture 138 and the bottom surface 134 of the cutting insert 130 rests against the top surface 116 of the shim 112.

Cutting assembly 94 further comprises a clamp 142 that has a body 144 and a threaded aperture 146 that passes through the length of the body 144. Clamp 142 further has an integral arm 148 that has a distal end 149. A clamp screw 150 has an upper threaded portion 151 and a lower threaded portion 152 wherein the lower threaded portion 152 is received within the threaded aperture 110 in the head portion 107 of the tool holder 96. The upper threaded portion 151 of the clamp screw 150 is received within the threaded aperture 146 of the clamp 144. The clamp 144 is tightened down by the rotation of the clamp screw 150 to that the cutting insert 130 and the shim 112 are firmly secured within the pocket 100 of the tool holder 96.

The clamping arrangement for the embodiment of FIG. 2 is along the lines of that shown and disclosed in U.S. Pat. No. 4,244,666 to Erickson et al. Other possible clamping arrangements for holding the cutting insert and the shim in the pocket of a tool holder include U.S. Pat. No. 3,996,651 to Heaton, U.S. Pat. No. 4,011,049 to McCreery, and U.S. Pat. No. 4,245,937 to Erickson.

Figure 3:
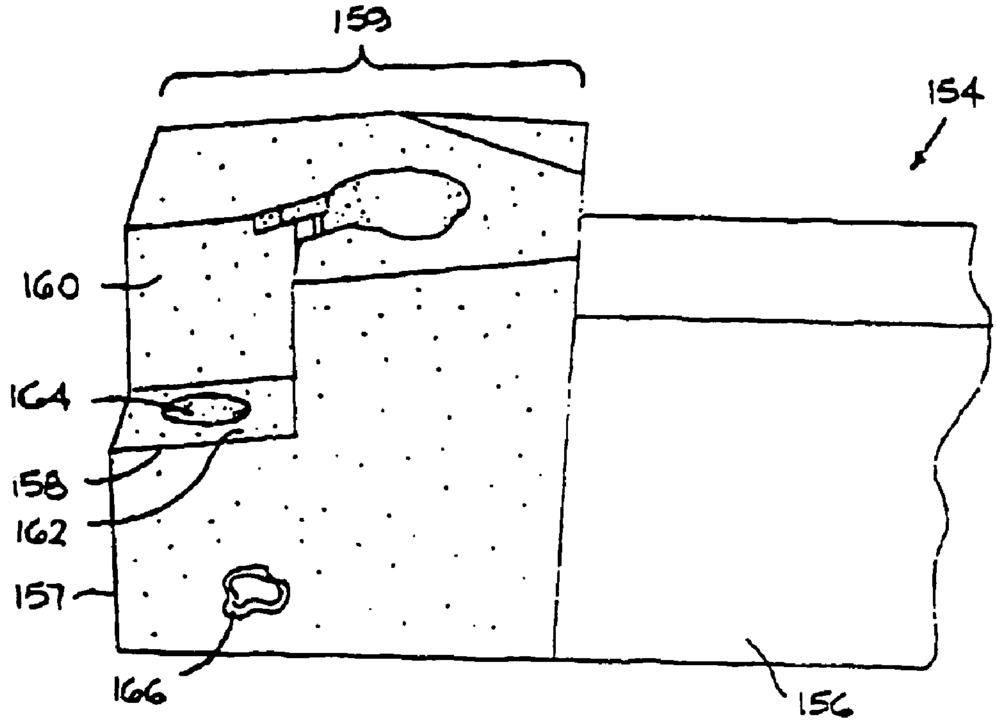
FIG. 3 is an isometric view of a specific embodiment of a tool holder that has a pocket wherein the surface of the head portion of the tool holder (that includes the pocket) is coated with an oxidation-resistant coating.

Referring to FIG. 3, there is shown another specific embodiment of a tool holder generally designated as 154. Tool holder 154 comprises a body 156 that has a head portion 159 (shown by brackets)at one end 157 and which contains a pocket 158. The entire head portion 159 (including the pocket 158) presents an oxidation-resistant surface due to an oxidation-resistant coating as described hereinafter. The pocket 158 in the tool holder body 156 has a pair of coated side surfaces 160 and a coated bottom surface 162 that intersects the coated side surfaces 160. The tool holder body 156 contains an aperture 164 (which may be threaded) in the coated bottom surface 162 of the pocket 158.

The coating on the head portion 159 is an oxidation-resistant material. Exemplary oxidation-resistant coatings (applied by physical vapor deposition [PVD] or chemical vapor deposition [CVD] depending upon the specific situation) for application to the head portion 159 may include alumina, titanium aluminum nitride, titanium nitride, titanium carbonitride, titanium carbide, or titanium diboride in single layer as well as various multi-layer coating schemes. One exemplary single layer coating scheme comprises a layer of titanium aluminum nitride applied by PVD. One example of a multi-layer coating scheme comprises a base layer (e.g., titanium carbide) and a coating of alumina on the base layer. Another coating scheme may comprise a base layer (e.g., titanium carbide), an intermediate layer of alumina on the base layer, and a layer of titanium nitride on the alumina layer. Yet another multi-layer coating scheme may comprise a base layer of titanium nitride applied by CVD to the substrate and a layer of titanium aluminum nitride applied by PVD to the base layer. Another coating scheme may comprise a base layer of titanium carbide applied by CVD to the substrate, a first intermediate layer of alumina applied by CVD to the base layer, a second intermediate layer of titanium nitride applied by CVD to the first intermediate layer, and a top layer of titanium nitride or titanium aluminum nitride or titanium diboride applied to the second intermediate layer by PVD.

Figure 4:
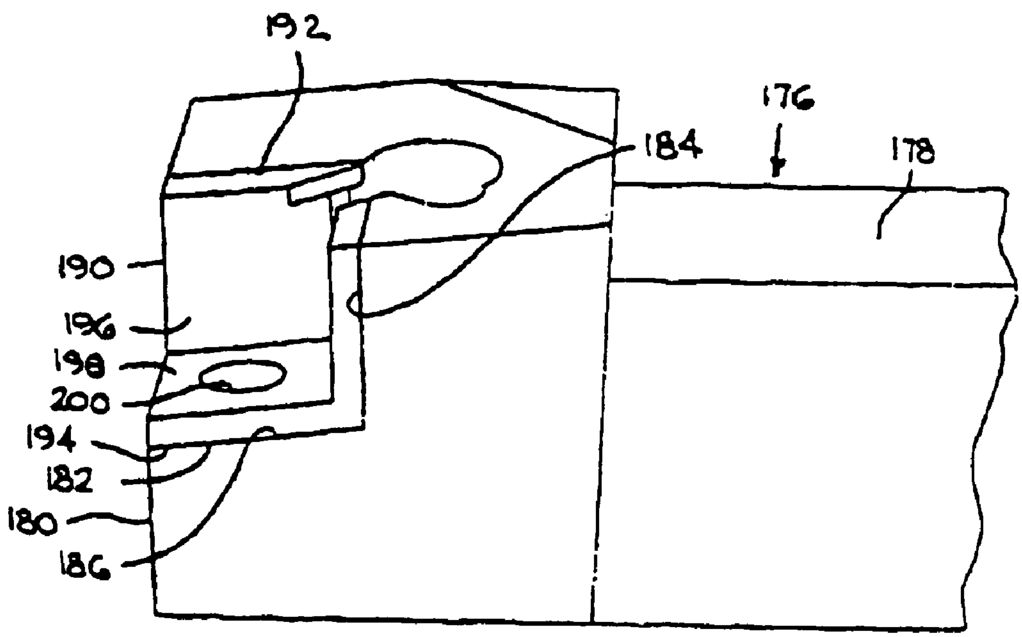
FIG. 4 is an isometric view of another specific embodiment of a tool holder that has a pocket wherein an oxidation-resistant insert is contained within the pocket.

Referring to FIG. 4, there is shown still another embodiment of a tool holder generally designated as 176. The tool holder 176 has a tool holder body 178 that contains a pocket 182 at the one end 180 thereof. The pocket 182 in the tool holder body 178 has a pair of side surfaces 184 and a bottom surface 186. The bottom surface 186 intersects the side surfaces 184. Although not shown the tool holder body 178 has an aperture (which may be threaded) contained in the bottom surface 186 of the pocket 182.

The tool holder 176 further includes an oxidation-resistant pocket insert 190 that is affixed within the pocket 182 of the tool holder body 178. The pocket insert 190 has a pair of external side surfaces 192 and an external bottom surface 194. The external side surfaces 192 of the pocket insert 190 are against the side surfaces 184 of the pocket 182 of the tool holder body 178. The external bottom surface 194 of the pocket insert 190 is against the bottom surface 186 of the pocket 182 in the tool holder body 178.

The pocket insert 190 has a pair of exposed side surfaces 196 and an exposed bottom surface 198. The exposed bottom surface 198 intersects the side surfaces 196. The exposed side surfaces 196 and the exposed bottom surface 198 each presents an oxidation-resistant surface as described hereinafter. The pocket insert 190 contains an aperture 200 therein wherein the aperture 200 is in alignment with the aperture in the pocket 182 of the tool holder body 178.

The pocket insert 190 is made from an oxidation-resistant material (e.g., a ceramic material). Exemplary materials for the pocket insert 192 include silicon nitrides, SiAlONs or alumina-based materials. Patents that are exemplary of silicon nitride and SiAlON ceramic materials include U.S. Pat. No. 4,563,433 to Yeckley, U.S. Pat. No. 4,711,644 to Yeckley, U.S. Pat. No. 4,889,755 to Mehrotra et al., U.S. Pat. No. 5,370,716 to Mehrotra et al., and U.S. Pat. No. 4,826,791 to Mehrotra et al. Patents that are exemplary of the alumina-based materials include U.S. Pat. No. 5,059,564 to Mehrotra et al., U.S. Pat. No. 5,024,976 to Mehrotra et al. and U.S. Pat. No. 4,965,231 to Mehrotra et al. The pocket insert 190 may also be made from either zirconia or hafnia.

As an option, the ceramic substrate may have an oxidation-resistant coating thereon. Exemplary oxidation-resistant coatings (applied by physical vapor deposition [PVD] or chemical vapor deposition [CVD]) for application to the ceramic substrate of the pocket insert may be the same as the coating materials and coating schemes used in conjunction with the head portion 159 of the tool holder 154.

Figure 5:
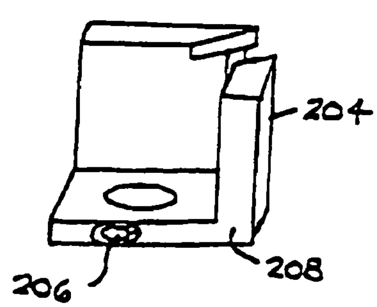
FIG. 5 is an isometric view of an alternate embodiment of the pocket insert designed for use with the tool holder of FIG. 4 wherein a portion of the oxidation-resistant coating on the pocket insert has been removed to expose the underlying substrate.

Referring to FIG. 5, there is shown an embodiment of the pocket insert 204 that can be used in conjunction with the tool holder of FIG. 4. Pocket insert 204 comprises a carbide-based substrate 206 and an oxidation-resistant coating 208 thereon. Optionally, the pocket insert may comprise a cermet with an oxidation-resistant coating thereon.

Exemplary carbide-based materials for the substrate 206 of the pocket insert 204 include cemented (cobalt) tungsten carbide wherein the cobalt content may range between about 0 weight percent and about 13 weight percent, and more preferably, the cobalt content ranges between 3 weight percent and 13 weight percent, and most preferably between about 6 weight percent and about 11 weight percent. Cemented (cobalt) tungsten carbide material may optionally contain additives such as titanium, tantalum, niobium, chromium and vanadium.

Exemplary oxidation-resistant coatings (applied by physical vapor deposition [PVD] or chemical vapor deposition [CVD]) for application to the substrate of the pocket insert 204 may be the same as the coating materials and coatings schemes described in connection with shim 42.

The substrate for the coated pocket insert may comprise a cermet material. The oxidation-resistant coatings and coating schemes for application to the cermet substrate may be the same as those described in connection with shim 42.

It is apparent that applicants have provided an improved cutting assembly. By providing a shim with an oxidation-resistant surface, the cutting assembly reduces the potential for chipping of the cutting insert due to post-indexing misalignment between the shim and the cutting insert, as well as reduces the accelerated wear rates of cutting inserts due to such misalignment. The shim may be made from a ceramic (uncoated or coated with an oxidation-resistant material) or a carbide-based substrate having an oxidation-resistant coating thereon or a cermet substrate having an oxidation-resistant coating thereon.

It is also apparent that applicants have provided an improved cutting insert by providing a tool holder that has a pocket with an oxidation-resistant surface. The pocket may be coated with an oxidation-resistant material or the pocket may contain a pocket insert wherein the pocket insert has an oxidation-resistant surface. The pocket insert may be made from a ceramic (uncoated or coated with an oxidation-resistant material) or a carbide-based substrate having an oxidation-resistant coating thereon or a cermet substrate with an oxidation-resistant coating thereon. By providing a pocket with an oxidation-resistant surface, the cutting assembly reduces the potential for chipping of the cutting insert due to post-indexing misalignment between the shim and the cutting insert, as well as reduces the accelerated wear rates of cutting inserts due to such misalignment.

The patents and other documents identified herein are hereby incorporated by reference herein.

Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting assembly comprising:

a tool holder including a pocket;

a discrete shim contained within the pocket, the shim presenting an oxidation-resistant surface when exposed to temperatures equal to about 400° C. or higher; and a cutting insert resting on the shim.

2. The cutting assembly according to claim 1 wherein the shim comprising a ceramic material.

3. The cutting assembly according to claim 2 wherein the ceramic material being selected from the group consisting of silicon nitride material, SiAlON material, an alumina-based material, zirconia and hafnia.

4. The cutting assembly according to claim 1 further including a mechanical chipbreaker, the chipbreaker presenting an oxidation-resistant surface.

5. The cutting assembly according to claim 1 wherein the shim being selected from the group comprising a cermet material, a carbide-based substrate, and a ceramic material, and the carbide-based substrate having an oxidation-resistant coating thereon.

6. The cutting assembly according to claim 5 wherein the oxidation-resistant coating comprising any one or more selected from the group consisting of titanium aluminum nitride, alumina, titanium nitride, titanium carbide, titanium carbonitride and titanium diboride.

7. The cutting assembly according to claim 5 wherein the oxidation-resistant coating comprises a base layer on the substrate and a layer of alumina on the base layer.

8. The cutting assembly according to claim 7 wherein the oxidation-resistant coating further comprises a layer of titanium nitride on the layer of the alumina.

9. The cutting assembly according to claim 5 wherein the oxidation-resistant coating comprises titanium aluminum nitride applied by PVD.

10. The cutting assembly according to claim 5 wherein the oxidation-resistant coating comprising a base layer of titanium nitride applied to the substrate by CVD and a layer of titanium aluminum nitride applied to the base layer by PVD.

11. The cutting assembly according to claim 5 wherein the oxidation-resistant coating comprising a base layer of titanium carbide applied to the substrate by CVD, a layer of alumina applied to the base layer by CVD, a layer of titanium nitride applied to the alumina layer by CVD, and a layer selected from the group consisting of titanium nitride or titanium aluminum nitride or titanium diboride applied to the titanium nitride layer by PVD.

12. The cutting assembly according to claim 1 wherein the pocket presenting an oxidation-resistant surface.

13. The cutting assembly according to claim 12 wherein the pocket having an oxidation-resistant coating.

14. The cutting assembly according to claim 13 wherein the oxidation-resistant coating comprising any one or more materials selected from the group consisting of titanium nitride, titanium aluminum nitride, titanium carbonitride, titanium diboride, alumina, and titanium carbide.

15. The cutting assembly according to claim 1 further including a pocket insert contained within the pocket and the packet insert presenting an oxidation-resistant exposed surface.

16. The cutting assembly according to claim 15 wherein the shim being contained within the pocket insert.

17. The cutting assembly according to claim 15 wherein the pocket insert comprising a ceramic material.

18. The cutting assembly according to claim 17 wherein the ceramic material selected from the group consisting of silicon nitride material, SiAlON material, an alumina-based material, hafnia and zirconia.

19. The cutting assembly according to claim 15 wherein the pocket insert comprising a substrate having an oxidation-resistant coating thereon, and wherein the substrate being selected from the group consisting of cermet material and carbide-based material.

20. The cutting assembly according to claim 19 wherein the oxidation-resistant coating comprising any one or more materials selected from the group consisting of titanium aluminum nitride, alumina, titanium nitride, titanium carbonitride, titanium diboride, and titanium carbide.

21. The cutting assembly according to claim 19 wherein the pocket insert comprising a substrate having an oxidation-resistant coating thereon, and wherein the substrate being selected from the group comprising silicon nitride material, SiAlON material, an alumina-based material, zirconia and hafnia, and wherein the oxidation-resistant coating comprising any one or more materials selected from the group consisting of titanium aluminum nitride, alumina, titanium nitride, titanium carbonitride, titanium diboride, and titanium carbide.

22. The cutting assembly according to claim 1 wherein the cutting insert comprising a polycrystalline cubic boron nitride cutting insert.

23. The cutting assembly according to claim 1 wherein the cutting insert comprising a polycrystalline diamond cutting insert.

24. The cutting assembly according to claim 1 wherein the cutting insert comprising a diamond coated cutting insert.

25. The cutting assembly according to claim 1 further including a mechanical chipbreaker wherein the chipbreaker resting on the cutting insert, and the chipbreaker comprising a ceramic selected from the group comprising silicon nitride material, SiAlON material, an alumina-based material, zirconia and hafnia.

26. The cutting assembly according to claim 1 further including a mechanical chipbreaker wherein the chipbreaker resting on the cutting insert, and the chipbreaker comprising a substrate having an oxidation-resistant coating thereon, and wherein the substrate being selected from the group comprising cermet material and carbide-based material and ceramic material, and wherein the oxidation-resistant coating comprising any one or more materials selected from the group consisting of titanium aluminum nitride, alumina, titanium nitride, titanium carbonitride, titanium diboride and titanium carbide.

27. A cutting assembly comprising:

a tool holder including a pocket, the pocket presenting an oxidation-resistant surface when exposed to temperatures equal to about 400° C. or higher; and a discrete shim contained within the pocket; and a cutting insert resting on the shim.

28. The cutting assembly according to claim 27 wherein the pocket having an oxidation-resistant coating.

29. The cutting assembly according to claim 28 wherein the oxidation-resistant coating comprising any one or more materials selected from the group consisting of titanium nitride, titanium aluminum nitride, alumina, titanium carbide, titanium carbonitride and titanium diboride.

30. The cutting assembly according to claim 27 wherein the pocket including a pocket insert contained therein, and the pocket insert presenting the oxidation-resistant surface.

31. The cutting assembly according to claim 30 wherein the shim being contained within the pocket insert.

32. The cutting assembly according to claim 27 wherein the shim comprising a ceramic material, and the ceramic material being selected from the group consisting of silicon nitride material, SiAlON material, an alumina-based material, zirconia and hafnia.

33. The cutting assembly according to claim 27 wherein the shim comprising a substrate selected from the group consisting of cermet material, carbide-based material, and ceramic material, and the substrate having an oxidation-resistant coating thereon.

34. The cutting assembly according to claim 33 wherein the oxidation-resistant coating comprising any one or more materials selected from the group consisting of titanium aluminum nitride, alumina, titanium nitride, titanium carbide, titanium carbonitride and titanium diboride.

35. A tool holder assembly comprising:

a tool holder containing a pocket therein; and a discrete shim contained within the pocket, and the shim presenting an oxidation-resistant surface when exposed to temperatures equal to about 400° C. or higher.

36. The tool holder according to claim 35 wherein the shim comprising a ceramic material, and the ceramic material being selected from the group consisting of silicon nitride material, SiAlON material, an alumina-based material, zirconia and hafnia.

37. The tool holder assembly according to claim 35 wherein the shim comprising a substrate selected from the group comprising cermet material, carbide-based material and ceramic material, and the substrate having an oxidation-resistant coating thereon, and the oxidation-resistant coating comprising any one or more materials selected from the group consisting of titanium aluminum nitride, alumina, titanium nitride, titanium carbide, titanium carbonitride and titanium diboride.

38. The tool holder according to claim 35 wherein the pocket presenting an oxidation-resistant surface.

39. A shim for use in conjunction with a tool holder having a pocket wherein the shim is within the pocket, the shim comprising:

a shim body; and the shim body presenting an oxidation-resistant surface when exposed to temperatures equal to about 400° C. or higher.

40. The shim according to claim 39 wherein the shim body comprising a ceramic material, and the ceramic material being selected from the group consisting of silicon nitride material, alumina-based material, SiAlON material, zirconia and hafnia.

41. The shim according to claim 39 wherein the shim body comprising a substrate selected from the group comprising a cermet material, a carbide-based material and a ceramic material, and the substrate having an oxidation-resistant coating thereon, and the oxidation-resistant coating comprising any one or more materials selected from the group consisting of titanium aluminum nitride, alumina, titanium nitride, titanium carbide, titanium carbonitride and titanium diboride.

42. A mechanical chipbreaker for use in conjunction with a cutting insert secured in the pocket of a tool holder, the chipbreaker comprising:

a chipbreaker body; and the chipbreaker body presenting an oxidation-resistant surface when exposed to temperatures equal to about 400° C. or higher.

43. The chipbreaker according to claim 42 wherein the chipbreaker body comprising a ceramic material, and the ceramic material being selected from the group consisting of silicon nitride material, alumina-based material, SiAlON material, zirconia and hafnia.

44. The chipbreaker according to claim 42 wherein the chipbreaker body comprising a substrate selected from the group comprising a cermet material, a carbide-based material and a ceramic material, and the substrate having an oxidation-resistant coating thereon, and the oxidation-resistant coating comprising any one or more materials selected from the group consisting of titanium aluminum nitride, alumina, titanium nitride, titanium carbide, titanium carbonitride and titanium diboride.

* * * * *